United States Patent [19]

Nippert

[11] 4,071,796

[45] Jan. 31, 1978

[54] DOUBLE INSULATED COMMUTATOR

[75] Inventor: Russell A. Nippert, Delaware, Ohio

[73] Assignee: The Nippert Company, Delaware, Ohio

[21] Appl. No.: 695,013

[22] Filed: June 11, 1976

Related U.S. Application Data

[63] Continuation of Ser. No. 568,503, April 16, 1975, abandoned.

[51] Int. Cl.2 .............................................. H02K 13/04

[52] U.S. Cl. ....................................... 310/236; 310/45

[58] Field of Search ................................ 310/233-236, 310/42-45, 219, 230; 174/138 R, 138 C, 138 G, 138 E

[56] References Cited

U.S. PATENT DOCUMENTS

| | | | |
|---|---|---|---|
| 2,501,502 | 3/1950 | Fletcher | 310/236 |
| 2,652,509 | 9/1953 | Gail | 310/236 |
| 2,990,488 | 6/1961 | Schafer | 310/235 |
| 3,141,984 | 7/1964 | Rubio-Medina | 310/236 |
| 3,161,947 | 12/1964 | Schafer | 310/235 |
| 3,500,094 | 3/1970 | Gilbert | 310/236 |
| 3,564,316 | 2/1971 | Witzenburg | 310/236 |
| 3,793,547 | 2/1974 | Etter | 310/236 |

OTHER PUBLICATIONS

Technical Information Laminating, Fabricating, & Processing of Nomex High Temp. Resistant Nylon Paper; Bulletin N-204; 2/1967.

*Primary Examiner*—R. Skudy

*Attorney, Agent, or Firm*—Biebel, French & Nauman

[57] ABSTRACT

The invention provides a double insulated commutator in which the steel V-rings which interlock with the dovetail bases of the commutator bars to lock the bars in place have a first insulator material applied in the form of a powdered epoxy resin which is heated to form a thin continuous insulating layer, and over which there is a thicker layer of laminated sheet material such as mica, a Nylon paper material, or the like.

4 Claims, 3 Drawing Figures

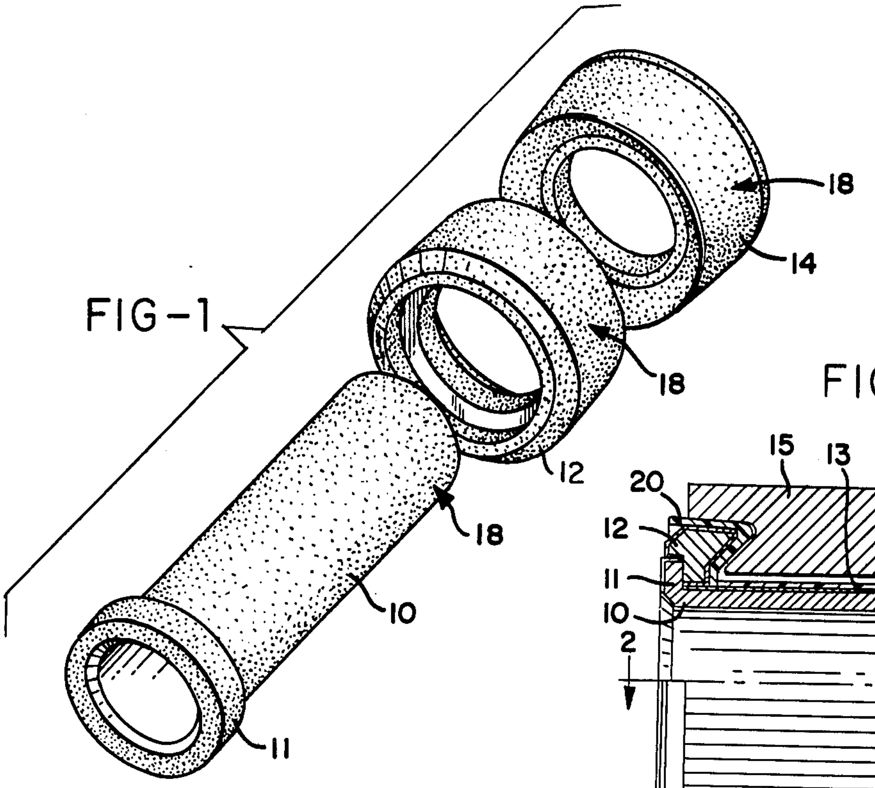
FIG-1
FIG-3
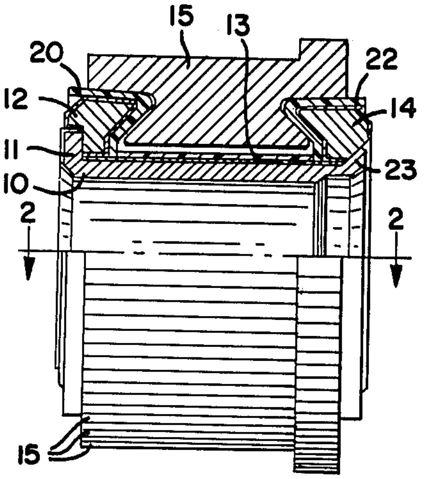
FIG-2
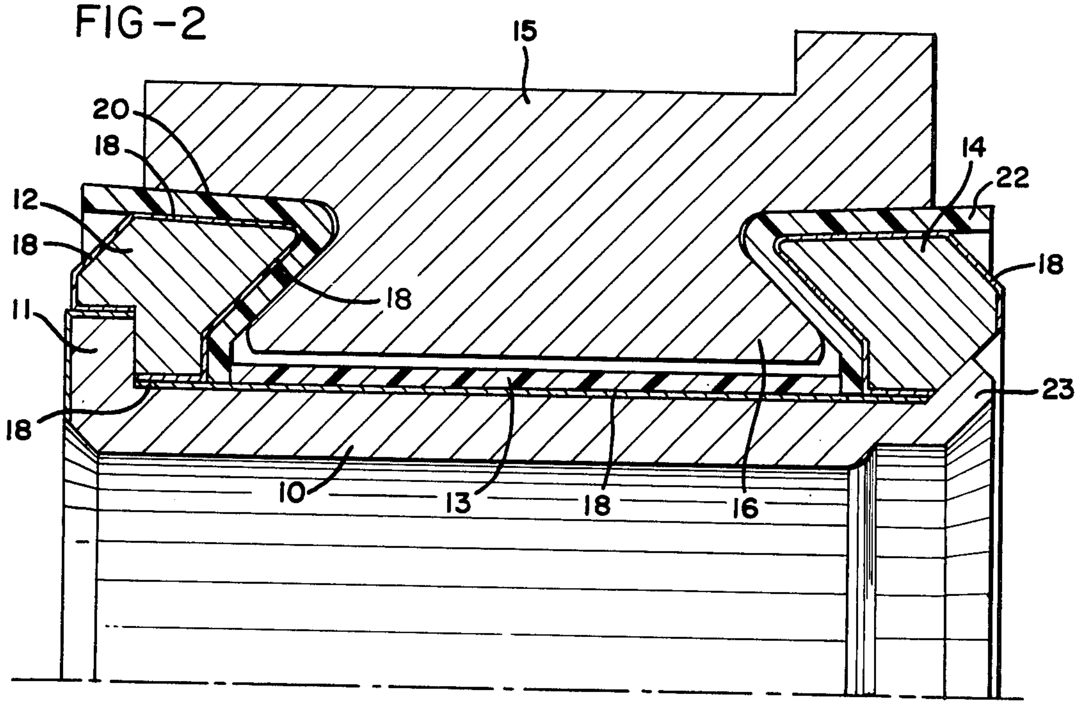

DOUBLE INSULATED COMMUTATOR

CROSS-REFERENCE TO RELATED APPLICATION

This application is a continuation of application Ser. No. 568,503, filed Apr. 16, 1975, now abandoned, and assigned to the same assignee.

BACKGROUND OF THE INVENTION

It has been proposed to insulate commutator bars by means of two or more sheets of insulating material such as mica and mica and glass tape. Likewise it is known to provide V-shape insulators and to dip the assembly in vacuo into a hardenable insulating substance such as Bakelite or an epoxy resin; likewise it has been proposed to apply a fluorinated ethylene-propylene band over a mica layer.

SUMMARY OF THE INVENTION

In order to obtain approval of the Underwriters Laboratories for high performance, a commutator for an electric motor is provided with double insulation, resulting in raising the rating from 1500 volts to ground up to 4000 volts to ground. The double insulation is provided by an initial or inner coating of powdered single epoxy resin which is cured by heating to form a uniform thin insulated coating over which there is placed a tube and rings of laminated insulating material such as mica or Nylon paper, the laminated material serving to protect the relatively brittle resin coating when the commutator is finished and placed in use, the laminated material having a certain resiliency which protects the resin coating.

BRIEF DESCRIPTION OF THE DRAWINGS

FIG. 1 is an exploded view of the steel shell and steel V-rings forming part of the commutator;

FIG. 2 is a sectional view on the axis of the commutator along center line 2—2 of FIG. 3 showing the assembled construction; and FIG. 3 is a view partly in side elevation and partly in longitudinal section showing the commutator assembly.

DESCRIPTION OF THE PREFERRED EMBODIMENT

The commutator comprises a steel shell 10 having an integral shoulder 11 against which there fits a V-shaped steel end ring 12 at one end which has the conventional V-shape groove for gripping the commutator bars. An insulating tube 13 fits over the shell 10 forming part of the insulation between the bars and the steel mounting parts. The corresponding V-shaped steel end ring 14 is assembled on the opposite end of the shell with a V-groove for completing the locking assembly of the commutator.

The commutator bars are shown at 15 having a dovetailed base 16 and adapted to lock the bars in place in the opposed grooves of V-shaped end rings 12 and 14 when assembled, the individual bars being insulated from each other in a conventional manner.

The steel shell 10, the shoulder 11 and the V-shaped end rings 12 and 14 are coated with an epoxy resin material indicated at 18 which is applied by electrostatic deposit. This is a one-part epoxy resin in ground powder form and is applied to the steel parts at room temperature by charging the powder in a fluidizing bed with a voltage of 25 to 50 kilovolts and passing the grounded part being coated over the bed. This makes for the deposit of a thin uniform coating of the order of 0.005 inches in thickness, providing a high value of electrical resistance and other desirable qualities. The coated parts are then heated to produce a thermoset condition at temperatures ranging from 350° F for 15 minutes to 450° F. for 3 minutes. This provides a complete insulating layer which however is somewhat brittle and without much resistance to chipping.

The second layer of insulation is provided by V-ring insulator 20 of a laminated material such as mica or Nylon paper material as described in co-pending application, Ser. No. 568,504, filed Apr. 16, 1975 (Docket 6027), or other insulating sheet material. The insulating tube 13 may also be made of the same material.

In assembly, after having been coated, the V-shaped end ring 12 is assembled on shell 10 and V-ring insulator 20 applied. Thereafter the insulating tube 13 is assembled. The commutator stack 15 is then assembled in position. Finally the insulating V-ring insulator 22 and the V-shaped steel end ring 14 are assembled following which the end 23 of shell 10 is spun to engage the end of V-shaped end ring 14 while the assembly is held under pressure to thereby securely lock the bars in place. The laminated material 20, 22 thus encloses the coated steel parts and having some resilience, it allows the assembly to be completed under pressure without damage to or chipping of the epoxy resin coating. With the double insulation thus provided the commutator qualifies for the higher Underwriters Laboratory rating, the rating thus being increased from 1500 volts to ground to 4000 volts to ground.

While the product herein described constitutes a preferred embodiment of the invention, it is to be understood that the invention is not limited to this precise product, and that changes may be made therein without departing from the scope of the invention which is defined in the appended claims.

What is claimed is:

1. A commutator for an electric motor comprising an assembly with a steel shell having an integral shoulder against which there fits a V-shaped end ring at one end, a second V-shaped end ring at the opposite end of said shell, said V-shaped end rings forming annular dovetail grooves, said shell and said end rings having an insulating coating of resin deposited thereon as a thin uniform layer over their entire outer surface, said resin coating being in a thermoset condition and providing a complete insulating layer, a separate second insulating layer of laminated sheet material overlying said resin coating on said end rings and on said shell, a plurality of commutator bars insulated from each other and having dovetails fitting into said grooves and held in place by said end rings, and an end of said shell engaging said second V-shaped end ring to thereby lock said commutator bars in said assembly.

2. A commutator as defined in claim 1 in which said resin is an epoxy resin.

3. A commutator as defined in claim 1 in which said second insulating material is a laminated mica.

4. A commutator as defined in claim 1 in which said second insulating material is a laminated nylon paper material.

* * * * *